United States Patent [19]
Laing

[11] 3,973,622
[45] Aug. 10, 1976

[54] TEMPERATURE-CONTROL SYSTEM WITH ROTARY HEAT EXCHANGERS

[76] Inventor: Nikolaus Laing, Hofener Weg 35-37, 7141 Aldingen, Germany

[22] Filed: Feb. 10, 1975

[21] Appl. No.: 548,673

Related U.S. Application Data

[60] Division of Ser. No. 286,569, Sept. 5, 1972, Pat. No. 3,877,515, Continuation-in-part of Ser. No. 847,771, June 17, 1969, abandoned.

[30] Foreign Application Priority Data

| Jan. 22, 1964 | Germany | 1426976 |
| Jan. 22, 1964 | Germany | 1221653 |

[52] U.S. Cl. ............... 165/86; 165/125; 62/499; 417/420
[51] Int. Cl.² ......... F28F 5/00; F24H 3/06
[58] Field of Search ........... 165/86, 122, 125; 62/499; 417/420

[56] References Cited
UNITED STATES PATENTS

| 2,609,672 | 9/1952 | Wales | 62/499 |
| 2,805,558 | 9/1957 | Knight | 62/499 |
| 2,991,982 | 7/1961 | Johnson | 165/125 |
| 3,025,684 | 3/1962 | McLain et al. | 62/499 |
| 3,189,262 | 6/1965 | Hanson et al. | 62/499 X |

*Primary Examiner*—Charles J. Myhre
*Assistant Examiner*—Theophil W. Streule, Jr.
*Attorney, Agent, or Firm*—Karl F. Ross; Herbert Dubno

[57] ABSTRACT

An independently heated or cooled room is linked with an environment of different temperature through a fluid-circulation system including a closed path traversed by a heat-carrier medium. The medium travels between two heat exchangers, respectively located in the warmer and in the colder air, under a pressure differential low enough to maintain a coherent flow at substantially uniform speed in one or more pairs of channels extending between the two heat exchangers.

4 Claims, 21 Drawing Figures

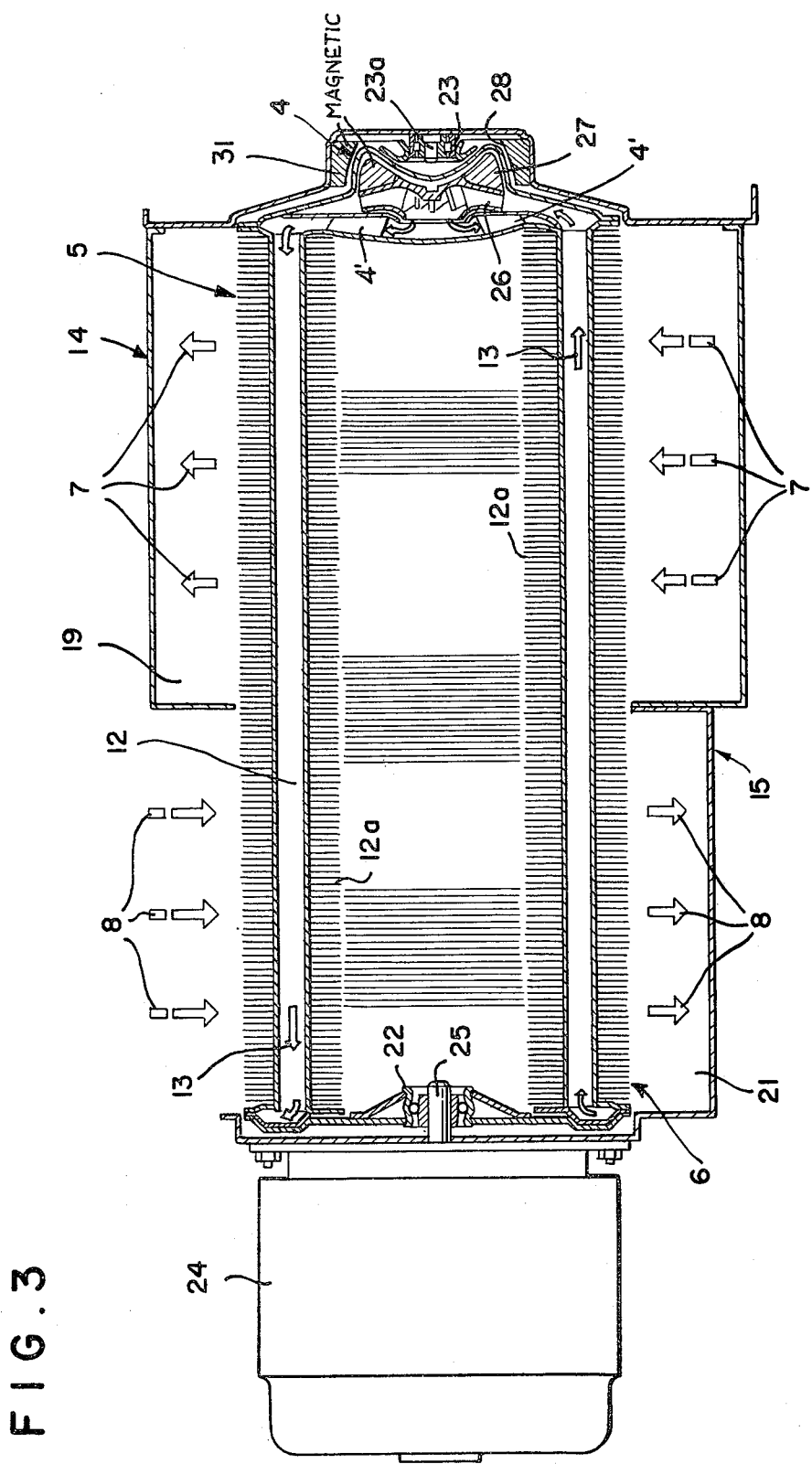

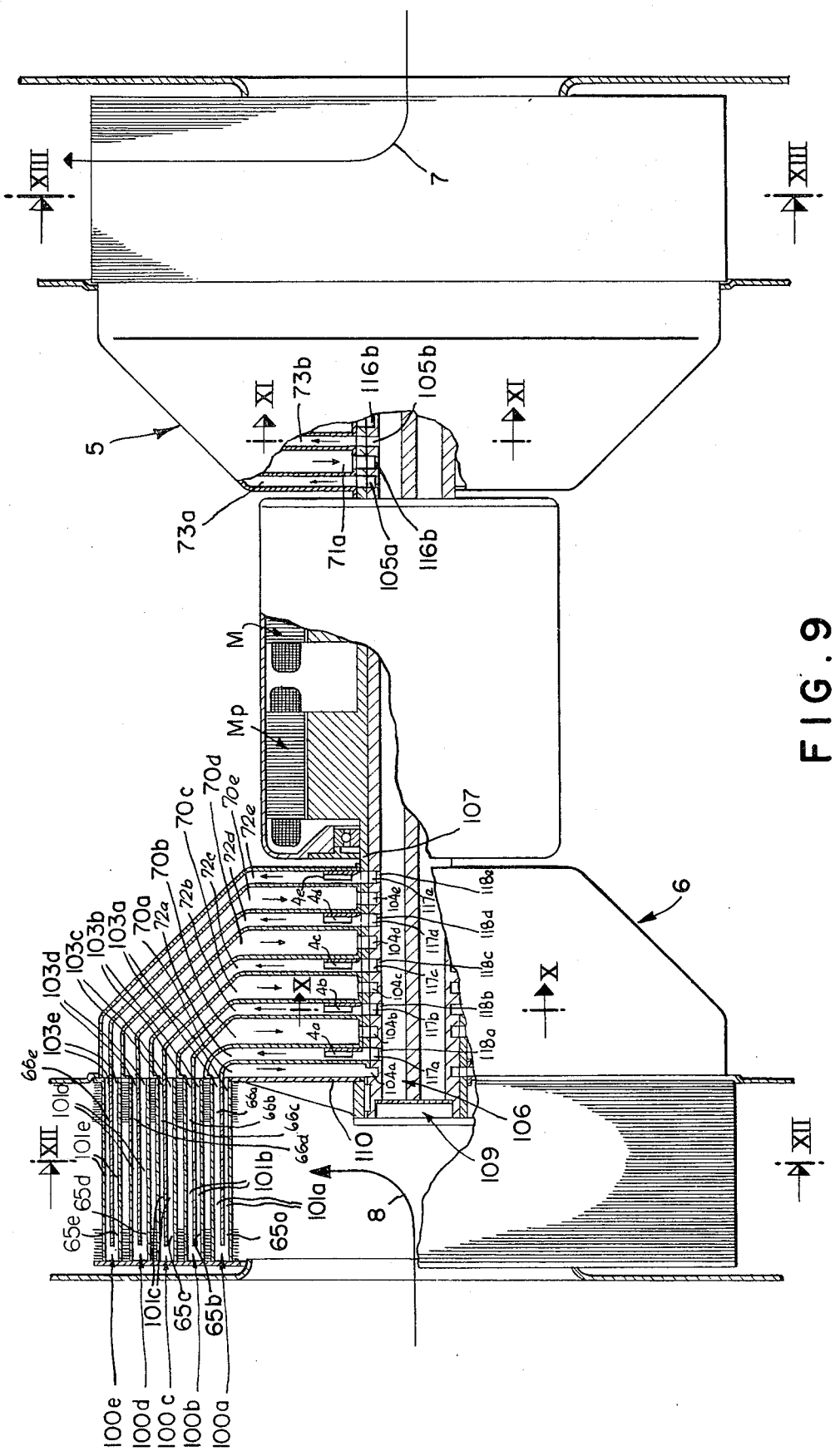

TEMPERATURE-CONTROL SYSTEM WITH ROTARY HEAT EXCHANGERS

This is a division of application Ser. No. 286,569, filed Sept. 5, 1972 now U.S. Pat. No. 3,877,515 granted Apr. 15, 1975, which is a continuation-in-part of my copending application Ser. No. 847,771 filed June 17, 1969 and now abandoned. The latter application partly discloses subject matter of other applications filed by me earlier and now abandoned, i.e.: Ser. No. 105,056 filed Apr. 24, 1961, included in Ser. No. 452,622 filed May 3, 1965, included in turn in Ser. No. 562,880 filed July 5, 1966 and its continuation Ser. No. 802,704 filed Dec. 11, 1968; and Ser. No. 427,323 filed Jan. 22, 1965, with continuation Ser. No. 566,088 filed July 18, 1966 and further continuation Ser. No. 585,819 filed Oct. 11, 1966, also since abandoned. This application also includes subject matter disclosed in my pending application Ser. No. 84,097 filed Oct. 26, 1970 now U.S. Pat. No. 3,811,515 granted Apr. 15, 1975.

My present invention relates to a system for controlling the temperature of a space subjected to extraneous heating or cooling. Such a system has utility, for example, in a heated room into which colder outside air is admitted continuously or intermittently for ventilating purposes or, conversely, in the cooling of the interior of a housing for electronic equipment or the like generating excess heat which must be dissipated.

The general object of my invention is to provide simple and effective means for maintaining a desired thermal equilibrium between two bodies of air or other fluids of different temperature, i.e. a first fluid in the space to be thermally controlled and a second fluid in an adjoining environment.

A more particular object is to provide means for increasing the efficiency of existing heating or air-conditioning equipment in a room or building by using available excess heating or cooling power to preheat or precool fresh air entering from the outside instead of wastefully discharging a like quantity of heated or cooled internal air directly into the atmosphere.

These objects are realized, in accordance with my present invention, by the provision of a first heat exchanger exposed to the fluid in the controlled space and a second heat exchanger exposed to the fluid in the adjoining environment, the two heat exchangers being interlinked by sealed conduit means forming a closed path for a heat-carrier medium (referred to hereinafter simply as "carrier") abstracting heat from the warmer fluid and giving off heat to the colder one. In contradistinction to conventional refrigeration systems in which the circulating medium is alternately compressed and expanded while moving back and forth between a heat sink and a heat source, the carrier in a system according to my invention is subjected to a pressure differential only sufficient to drive it through the circuit with a coherent flow and at substantially constant speed in each of the stretches extending between the two heat exchangers. These stretches, therefore, may be constituted by tubes or other channels of more or less constant cross-section, e.g. axial passages in a shaft supporting a pair of rotors respectively forming part of the two coaxially mounted heat exchangers.

This substantial constancy of the flow rate in each stretch is maintained even if the carrier undergoes a change of its state of aggregation on passing through the heat exchangers. Thus, the invention can be realized with a carrier which remains either gaseous or liquid (preferably the latter) throughout its path or which is alternately vaporized and condensed by the absorption and release of heat at the two terminal points of the circuit.

For use at substantially ambient temperatures, the carrier could be ethyl or methyl alcohol, or freon; at elevated temperatures, sodium or a eutectic mixture of sodium and potassium is preferred.

The circulation of the carrier along its closed path may be effected by various means, e.g. by relative rotation of a set of vanes and a surrounding duct in one of the heat exchangers. In order to insure absolute fluid-tightness, the vanes may be entrained (or arrested with reference to the rotating duct) by magnetic force, e.g. as disclosed in commonly owned U.S. application Ser. No. 42,018 filed June 1, 1970, now U.S. Pat. No. 3,696,634. In the case of an electrically conductive carrier it is also possible to induce the desired relative motion by eddy currents. Finally, a thermosiphon effect may be utilized by letting the carrier circulate in two heat-exchanger rotors of different effective diameters through radial extensions of the axial channels, with the colder and therefore specifically heavier portion of the carrier moving outwardly over a larger radius than the warmer portion.

According to a further feature of my invention, each heat exchanger (or at least one of them) may be subdivided into a plurality of cascaded heat-exchange stages successively traversed by the carrier in counterflow to the external fluid, i.e. with a variation in carrier temperature generally paralleling the change in the temperature of that fluid. Thus, in a heating cycle, the hottest portion of the carrier traverses the stage last encountered by the external flow which has therefore already been preheated by the other units to nearly the same temperature; in a cooling cycle, of course, the relationship is reversed. In either case, the cascaded stages are advantageously constituted by a plurality of interconnected branch channels in the heat-exchanger rotor communicating with respective channel pairs in the shaft, these channel pairs being formed by peripherally offset sectoral passages.

The motive power for driving the rotors of the heat exchangers may be obtained either from a separate motor or from one of the fluids involved in the exchange, the latter in particular where the system is used for abstracting heat from high-pressure gases or vapors issuing from a combustion chamber or a boiler.

According to another feature of my invention, an especially efficient heat transfer is achieved if the carrier passes through axially extending tubes forming part of the rotor body, these tubes being provided with transverse fins which are sufficiently closely spaced to develop a shear force which entrains the surrounding fluid in a generally radial direction so as to create an outward flow at a rate determined by the rotor speed. I have found that it is highly advantageous to dispose the tubes substantially along segments of an archimedean spiral whose pitch should be so correlated with the rotor speed, or more generally with the flow rate, that the spiral array of tubes exerts substantially no reaction (in either an accelerating or a retarding sense) upon the flow, i.e. that this array does not act as either an impeller blade or a turbine blade. The tubes in such a case are preferably round but could also have an elongate cross-section extending in the direction of the spiral; the tubes may be internally partitioned to let the carrier of an associated channel pair pass therethrough in opposite directions.

The above and other features of my invention will be described in detail hereinafter with reference to the accompanying drawing in which:

FIG. 3 is an axial sectional view of an apparatus, taken in the direction of arrows as seen from the line III—III of FIG. 4, to be used in the system of FIG. 1;

FIG. 9 is a partly elevational and partly sectional view of an apparatus representing a further embodiment;

Figure 1:
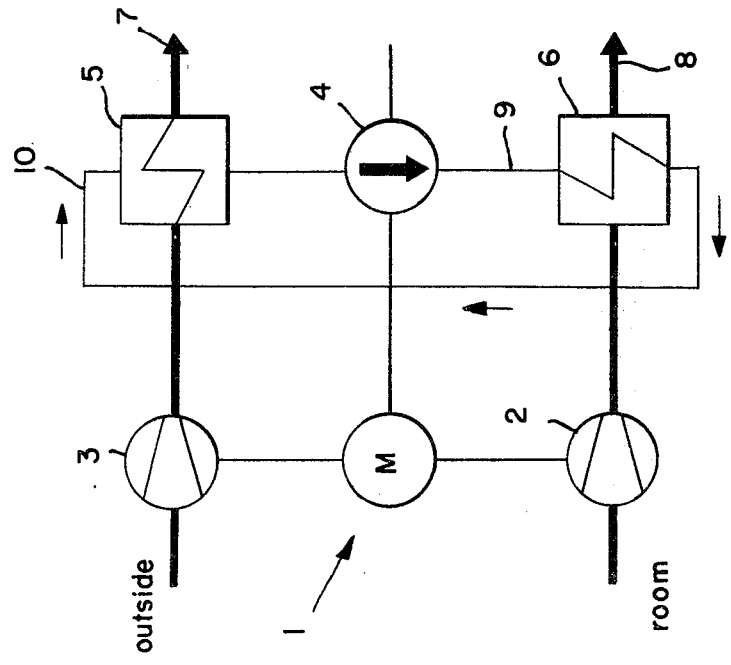
FIG. 1 is a block diagram of a ventilating and heat-recuperating system embodying my invention.

In FIG. 1 I have schematically illustrated a ventilating and heat-recuperating system 1 serving to transfer heat from or to a stream of used air, which is being withdrawn from a body of spent air in a room, to or from a stream of fresh air which enters the room and is being withdrawn from a body of atmospheric air, i.e. from the external environment. The system comprises a prime mover, here shown as an electric motor M, which drives two air-circulating blowers 2, 3 and a pump 4 for displacing a liquid or gaseous heat-carrier medium. The blower 2 drives used air from the room (arrow 8) to the outside while the blower 3 draws fresh air from the outside into the room (arrow 7). Used air passes through a heat exchanger 6 and thermally interacts with the carrier which is circulated by the pump 4 to flow in a closed circuit including ducts 9 and 10. The stream of fresh air thermally interacts with the same carrier in another heat exchanger 5. After passing through the duct 10 the carrier is cooled in the heat exchanger 5 if, as assumed for the present, the outside temperature is below room temperature, i.e. if the room is independently heated. The thus-cooled carrier flows through the duct 9 and abstracts heat from warmer air in the heat exchanger 6 whereupon it re-enters the duct 10. It will be seen that the cooler stream (arrow 7) cannot be contaminated by the warmer stream (arrow 8), or vice versa, and that the two streams cannot contaminate, or be contaminated by, the carrier.

If the temperature of the air stream which leaves the room (arrow 8) is lower than the temperature of the inflowing air stream (arrow 7), i.e. if the room is independently cooled, the inflowing air is cooled in the heat exchanger 5 by the carrier which transfers its heat to the outflowing air in the heat exchanger 6. Elements 4, 5, 6, 9 and 10 together form a sealed circuit for the carrier.

Figure 2:
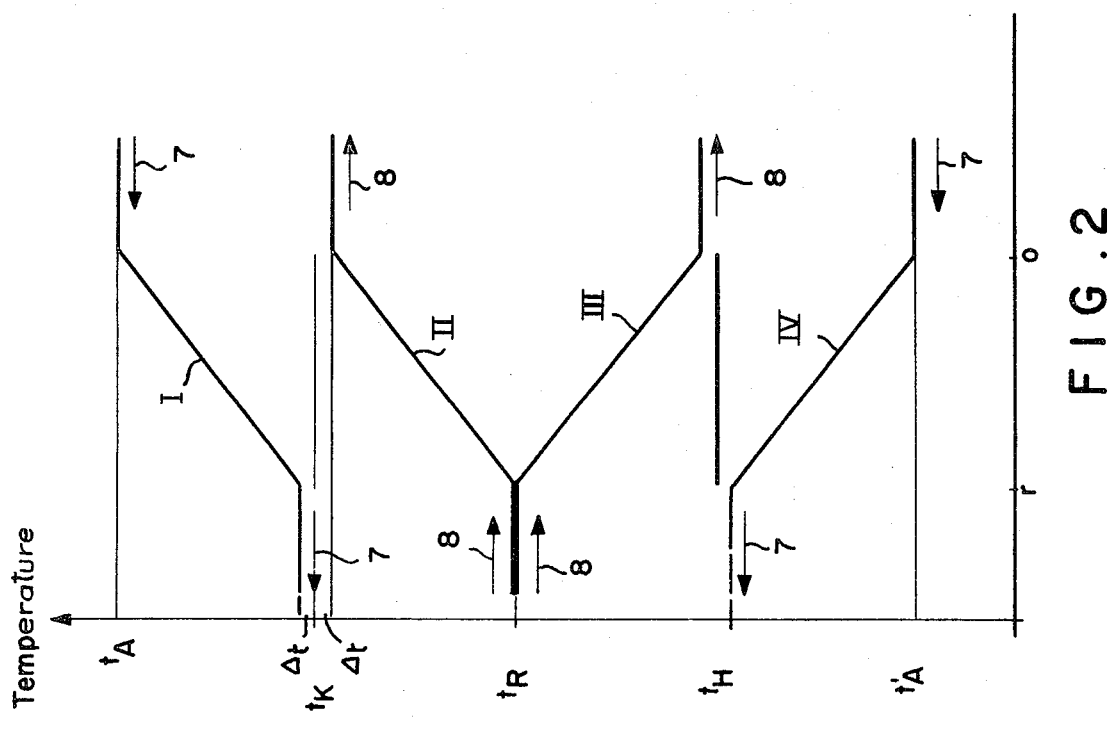
FIG. 2 is a schematic view of the temperature pattern in the system of FIG. 1 for heating and cooling operation.

FIG. 2 illustrates the temperature pattern for the heat exchangers 5, 6 of the apparatus shown in FIG. 1 when the room temperature is lower (curves I, II) or higher (curves III, IV) than the outside temperature. The temperature to be maintained in the room is marked $t_R$. Curves II and III show the temperature pattern in the heat exchanger 6 during the cooling phase and the heating phase, respectively. Curves I and IV show the temperature pattern in the heat exchanger 5 for the cooling and heating phases, respectively.

In summer, as shown by the curve I, the carrier in the heat exchanger 5 absorbs heat from the fresh-air stream represented by the arrows 7 so that incoming air is cooled from the outside temperature $t_A$ to an intermediate temperature $t_K+\Delta t$. The carrier, which has a mean temperature $t_K$, is transported by the pump 4 from the heat exchanger 5 to the heat exchanger 6 where it transfers heat to the outgoing air stream, represented by arrows 8, whose temperature pattern is given by curve II; thus, the temperature of this outgoing air stream is raised from room level $t_R$ to an intermediate level $t_K-\Delta t$ slightly below the temperature of air stream 7.

In winter, as shown by curves IV and III, the operation is analogous with maintenance of a mean carrier temperature $t_H$.

As can be readily seen from the temperature diagram of FIG. 2, the heat-recuperating system according to my invention is able to recover 50% of the heat otherwise lost, this representing an ideal case with $\Delta t = 0$ (i.e. with the heat-exchange surface assumed to be infinite). Thus, the temperature difference $t_R - t_H$ exists in the heating phase and the temperature difference $t_K - t_R$ exists in the cooling phase; these differences have to be balanced by a supplemental heating or cooling system not shown. Naturally, the outside temperatures $t_A$ and $t'_A$ (and thus also the intermediate temperatures $t_K$ and $t_H$) are subject to temperature fluctuations of the ambient atmosphere.

It is also evident from FIGS. 1 and 2 that a continuous transition from heating to cooling operation and vice versa can be effected without changing the direction of air flow and without reversing the carrier flow in the sealed circuit. In switching between heating and cooling operation, the heat exchangers 5 and 6 merely change functions.

The abscissa segment between points $r$ and $o$ in FIG. 2 shows the temperature rise or drop along the flow path of the individual heat exchangers.

Figure 4:
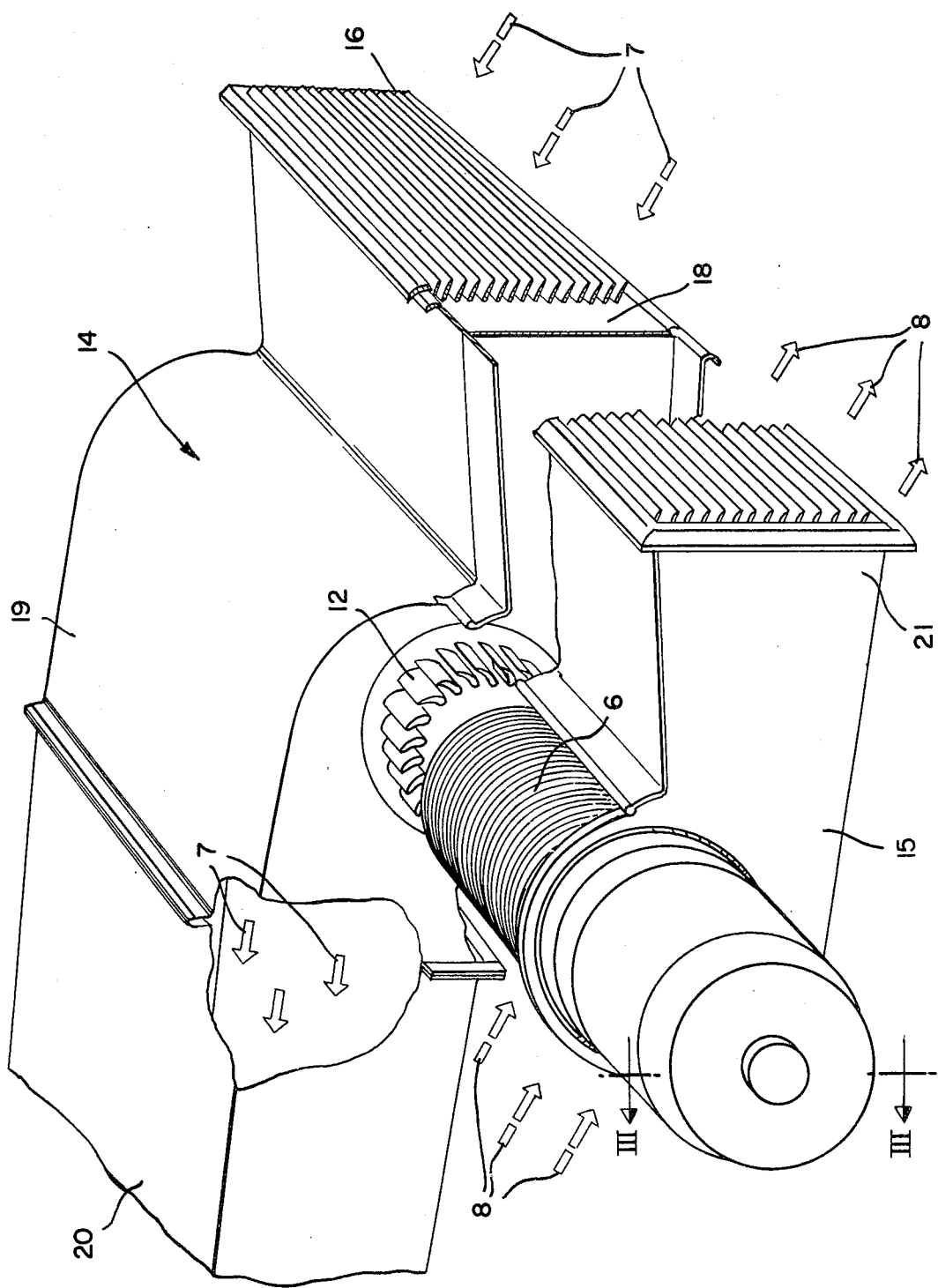
FIG. 4 is a perspective view (parts broken away) of the apparatus shown in FIG. 3.

FIGS. 3 and 4 show the structure of a ventilating and heat-recuperating apparatus included in the system of FIG. 1. The apparatus comprises rotary heat exchangers 5 and 6 of the type hereinabove referred to as cross-flow blowers, with hollow blades 12 traversed by a liquid heat carrier, such as an alcohol, in the direction indicated in FIG. 3 by arrows 13. The heat exchangers 5 and 6 are coaxial and are directly interconnected by the hollow blades 12. The air is guided through the heat exchangers 5 and 6 by a housing including a first shell 14 for the heat exchanger 5 and a second shell 15 for the heat exchanger 6. The fresh-air stream flowing through the rotary heat exchanger 5 is aspirated through a grill 16 and an inlet port 18 in the direction of arrows 7 and transported through an outlet port 19 to a distributing manifold 20 whence it is conducted to the room or rooms to be ventilated. The used-air stream is aspirated in the direction of arrows 8 through an inlet port of heat exchanger 6 and discharged through an outlet port 21 by way of the same grill 16.

The physically interconnected rotary heat exchangers 5 and 6 form a single rotor body mounted at its ends in ball bearings 22 and 23, the bearing 22 being for instance of the self-aligning tapering type whereas the bearing 23 is a simple journal bearing for a stub shaft 23a rigidly fixed to the rotor body. The latter is driven by a motor 24 with shaft 25 via reduction gearing not shown. The carrier-circulating pump 4, here shown to be of the radial type, feeds the carrier to every other blade and draws it from the intervening blades so that adjacent rotor blades are traversed by the carrier in opposite directions. As more fully illustrated in subsequent Figures, the blades are surrounded by annular cooling fins 12a to enhance the heat transfer.

The pump 4 has an impeller with radial vanes 4' and a casing with return guide vanes 26. These return guide vanes are rigidly fixed to a ferromagnetic ring 27 which is held in place by a similar outer ring 31 separated therefrom by a thin metal sheet 28 hermetically sealing the carrier circuit (communicating with the interior of the rotor blades 12) against the outside. At least one of the rings 27, 31 is permanently magnetized. Thus the casing with vanes 26 is immobilized while the rotating impeller vanes entrain the carrier to drive it along its closed path. As explained in connection with FIGS. 1 and 2, the temperature level of the heat carrier in the hollow blades 12 adjusts itself automatically, so that the temperature of the heated or cooled air stream is likewise adjusted. The air volume is easily controlled by butterfly valves (not shown) located in the suction and/or pressure channels, or by changes in rotor speed. The channels defined by blades 12 represent the stretches 9 and 10 of FIG. 1 along which the carrier flows at substantially uniform speed between the two heat exchangers 5, 6.

The return guide vanes 26 need not be completely stationary but, with their mounting ring 27, could also rotate at a speed different from that of the impeller 4'. Thus, the magnetic field linking the rings 27 and 31 need only exert a retarding effect upon the pump casing.

Figure 5:
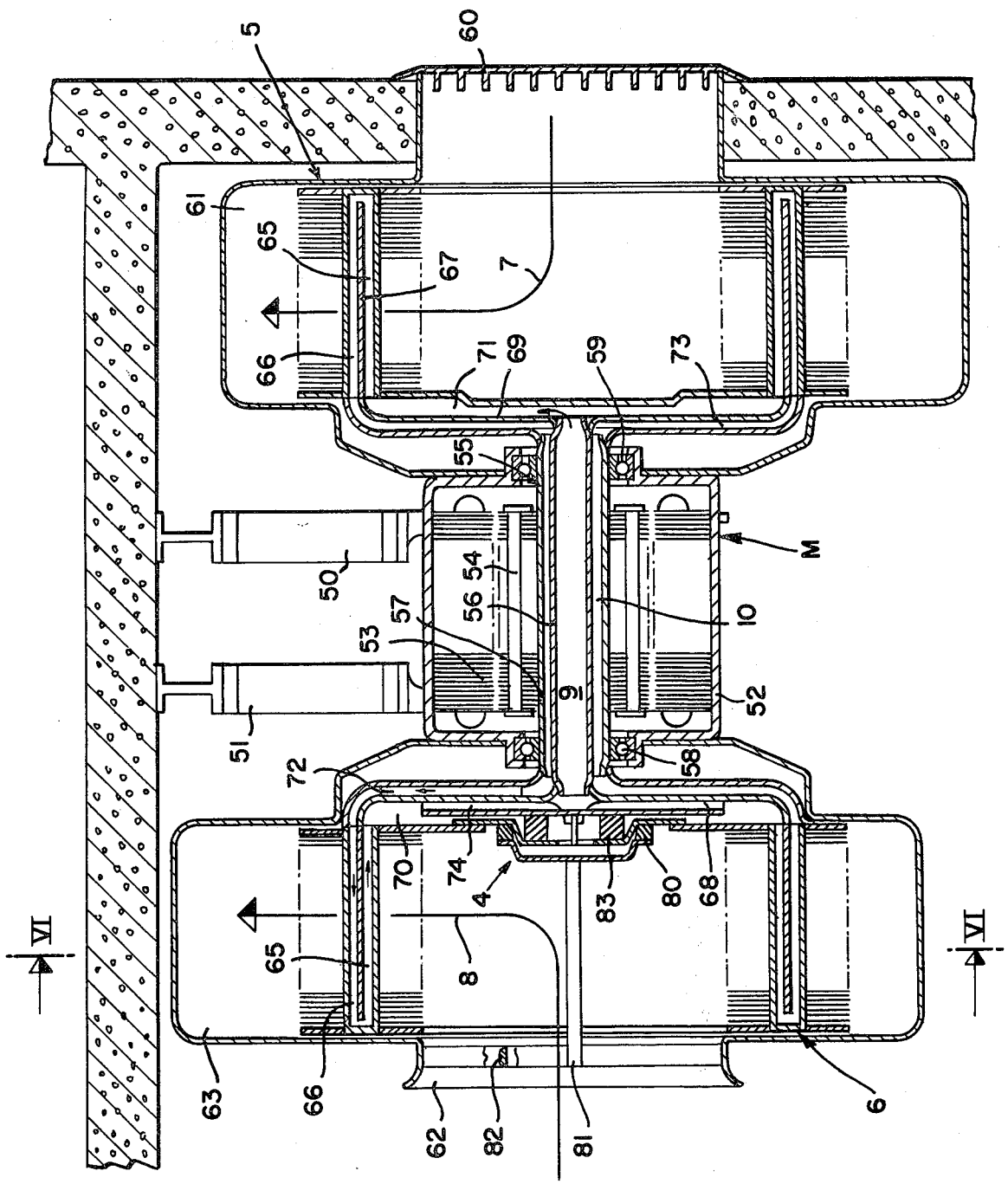
FIG. 5 is a sectional view similar to FIG. 3, showing a modification.
Figure 6:
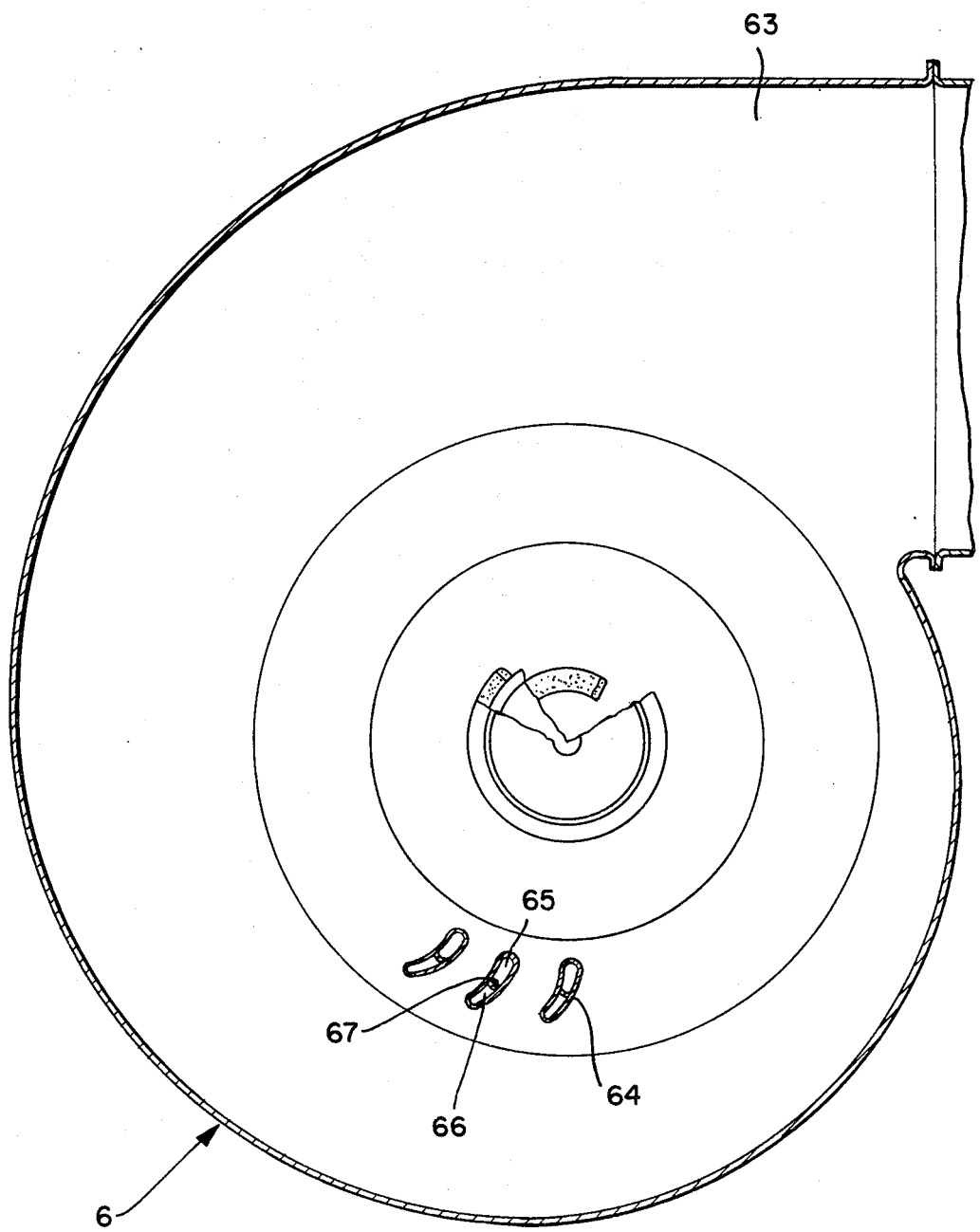
FIG. 6 is a cross-sectional view taken on the line VI—VI of FIG. 5.

FIGS. 5 and 6 show an embodiment of my invention wherein, in contradistinction to the embodiments of FIGS. 3 and 4, the two rotary heat-exchanger units are traversed by an axially entering and radially exiting flow.

As shown in FIG. 5, a motor M is centrally mounted on brackets 50 and 51 which are rigidly connected to a housing 52 containing the stator 53 and the armature 54 of the motor.

Armature 54 includes a set of coils wound on a hollow shaft 55 consisting of two coaxial cylinders 56 and 57 defining a cylindrical inner passage 9 and an annular outer passage 10 which represent the two stretches referred to above (cf. FIG. 1). The shaft 55 is mounted in bearings 58 and 59 with both of its extremities protruding from the motor housing 52. These extremities carry the two rotary heat exchangers 5 and 6, again constituted by rotary blowers, traversed by air streams flowing in the directions of arrows 7 and 8, fresh air being axially aspirated from the outside through an inlet port provided with a grill 60 and passing through a scroll-type outlet channel 61 of the blower 5 into the room. Similarly, the stream of used air is axially aspirated by the blower 6 through an inlet port 62 and fed to a scroll-type outlet channel 63 (see FIG. 6) leading to the outer atmosphere.

As best seen in FIG. 6 for the rotor 6, each of these rotors comprises an array of hollow blades 64 (illustrated only in part), the interior of each blade being longitudinally subdivided into two passages 65 and 66 by an axially extending partition 67. If desired, each hollow blade 64 may consist of two discrete tubes which form the two passages 65, 66. The hollow end plates supporting the blades of the rotors 5 and 6 and facing the motor M (FIG. 5) are subdivided by radial partitions 68 and 69 to define inner chambers 70, 71 and outer chambers 72, 73, respectively. The passages 66, which are nearer to the tips of the hollow blades 64 of each of the two rotors, respectively lead to the outer chambers 72, 73, communicating with each other via the annular outer channel 10 of the hollow shaft 55. Similarly, the passages 65 nearer to the centers of the two rotors respectively communicate with the inner chambers 70, 71 which, in turn, open into the cylindrical inner channel 9 of shaft 55. As the passages 65 and 66 are interconnected at the suction-side ends of the rotors, the result is a hermitically sealed circuit in which the carrier moves in the directions indicated by arrows in FIG. 5.

As in the embodiment shown in FIGS. 3 and 4, the carrier in the circuit of FIGS. 5 and 6 is moved by a radial pump 4 having return guide vanes 74 on a ferromagnetic ring 83 which, in the manner described above, is held against rotation by a system of magnets on an outer ring 80 which is fixed to the housing of the rotor 6 by a central rod 81 and spider legs 82.

Figure 7:
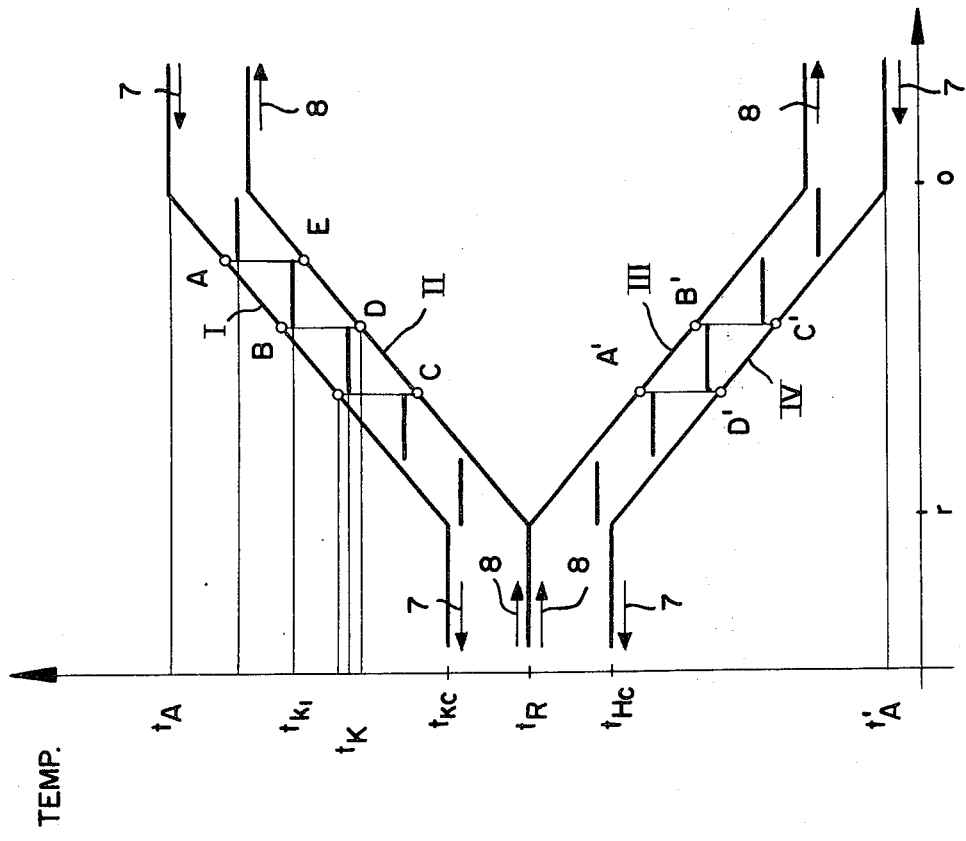
FIG. 7 is a schematic view similar to FIG. 2, showing the temperature pattern in a system using cascaded heat-exchanging stages.

FIG. 7 shows the temperature pattern of an arrangement in which the carrier circuit is divided into several (here five) cascaded subcircuits, each of the subcircuits comprising a heat-exchange stage with two branches wherein heat is respectively absorbed and given up by the carrier. The heat exchange between the two air streams 7 and 8 and the blower rotors, traversed by the carrier in countercurrent thereto, results in higher thermodynamic efficiency.

Curve I of FIG. 7 shows at A – B the temperature drop of the carrier in a heat-exchange unit of a subcircuit in the cooling phase. The carrier moving in this subcircuit (arrows 7) cools the air to a temperature $t_K + \Delta t$ and transfers the absorbed heat in the other heat-exchange unit to the air stream (arrows 8) which has been drawn from the room to be ventilated. The temperature pattern in this latter unit is shown by the section C–D of curve II. The air flows then to the corresponding heat-exchange unit of the next subcircuit where its temperature is raised to $t_{K1} - \Delta t$, according to section D–E of curve II. The individual subcircuits are cascaded in both directions of flow.

The lower curves III and IV of the temperature pattern represent the heating phase, with the air temperature rising in one subcircuit between points of A′ and B′ (curve III) while the carrier temperature drops between points C′ and D′ (curve IV). The heat to be replaced in this instance as defined by the temperature difference $t_{Kc} - t_R$ represents the necessary energy input. These temperature differences are much smaller than the corresponding temperature differences in the single-stage systems of FIGS. 1 to 6; thus, the cascading as per FIG. 7 affords better heat recuperation.

Figure 8:
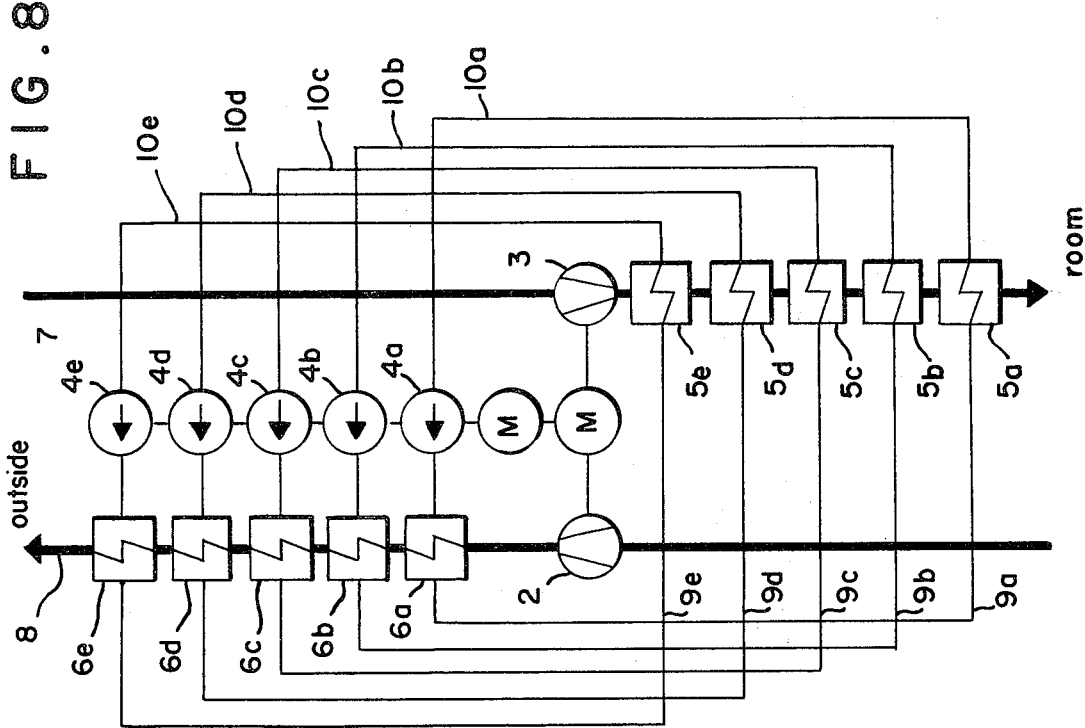
FIG. 8 is a block diagram of an apparatus according to the invention with cascaded heat-exchange stages operating with a temperature pattern as shown in FIG. 7.

FIG. 8 is a flow diagram of a cascaded temperature-control system whose mode of operation follows the temperature pattern depicted in FIG. 7. The reference numerals used in FIG. 8 are analogous to those employed in the basic block diagram of FIG. 1 for a single carrier circuit. Thus, the heat exchanger 5 for the incoming stream 7 circulated by the blower 3 has been replaced by the heat-exchanger stages 5a to 5e of the individual subcircuits. The same applies to pumps 4a to 4e, heat-exchange units 6a to 6e for the outgoing air stream 8 circulated by blower 2, and associated conduits 9a to 9e and 10a to 10e. The individual subcircuits, distinguished by the postscripts a to e, are so arranged that the stages 5a to 5e are traversed by the air flow in a direction opposite that of stages 6a to 6e. The carrier passing through stage 6a, closest to blower 2 and therefore cooled (or heated) to a level near the room temperature, passes immediately thereafter through stage 5a, farthest from blower 3, so as to provide final cooling (or heating) for the incoming air already precooled (or preheated) by the four preceding stages.

Thus, the fresh-air stream is cooled along section A–B of curve I in stage 5c and the heat so extracted is transferred to the used-air stream in the same subcircuit along the portion C–D of the curve II in the stage 6c. With the total temperature difference between room temperature and outside temperature $t_A - t_R$ in the cooling phase and $t_R - t'_A$ in the heating phase subdivided into several steps, the residual temperature differential $t_{Kc} - t_R$ or $t_R - t_{Hc}$ is reduced in proportion to the number of stages. The cascaded system, therefore, combines the higher thermodynamic efficiency of the countercurrent circuit with the high heat-transfer coefficients of rotary heat exchangers.

In FIGS. 9 – 13 I have shown an adaptation of the apparatus of FIGS. 5 and 6 to the cascaded system described with reference to FIGS. 7 and 8. Similar reference numerals have been used, with the addition of postscripts $a - e$ where necessary to distinguish the several subcircuits. Pumps 4a – 4e have been symbolized in FIG. 9 only by their radial vanes.

Rotors 5 and 6 have respective sets of blades 102 and 100 extending along segments of archimedean spirals, each blade 100 being composed of five tubes 102a – 102e and 100a – 100e which (as illustrated for blades 100) are subdivided by longitudinal partitions 67a – 67e into paired passages 65a – 65e and 66a – 66e. Passages 65a – 65e communicate with generally frustoconical manifolds 72a – 72e in rotor 6 and 73a, 73b etc. in rotor 5; passages 66a – 66e communicate with similar manifolds 70a – 70e in rotor 6 and 71a etc. in rotor 5. The manifolds are connected to the axially extending blade passages at junctions 103a – 103e as illustrated in FIG. 9 for the rotor 6.

Figure 10:
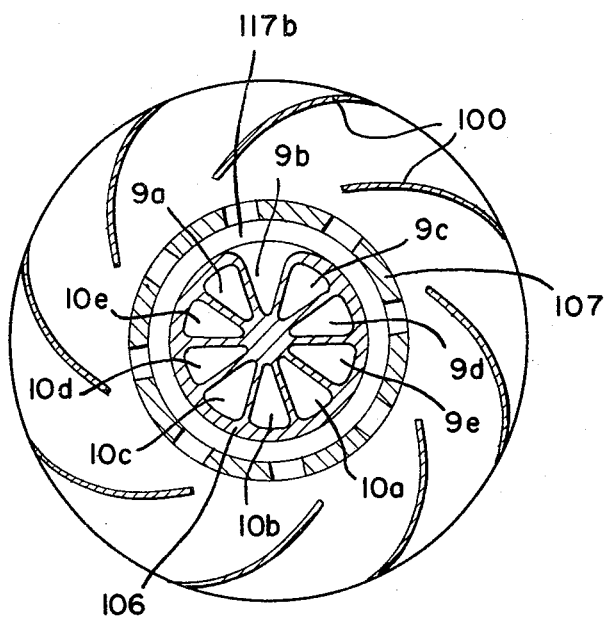
FIGS. 10, 11, 12 and 13 are cross-sectional views respectively taken on the lines X—X, XI—XI, XII—XII and XIII—XIII of FIG. 9.
Figure 11:
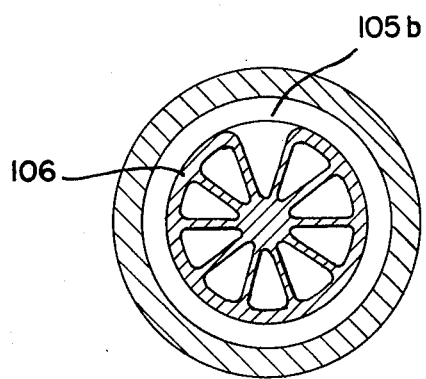
Figure 12:
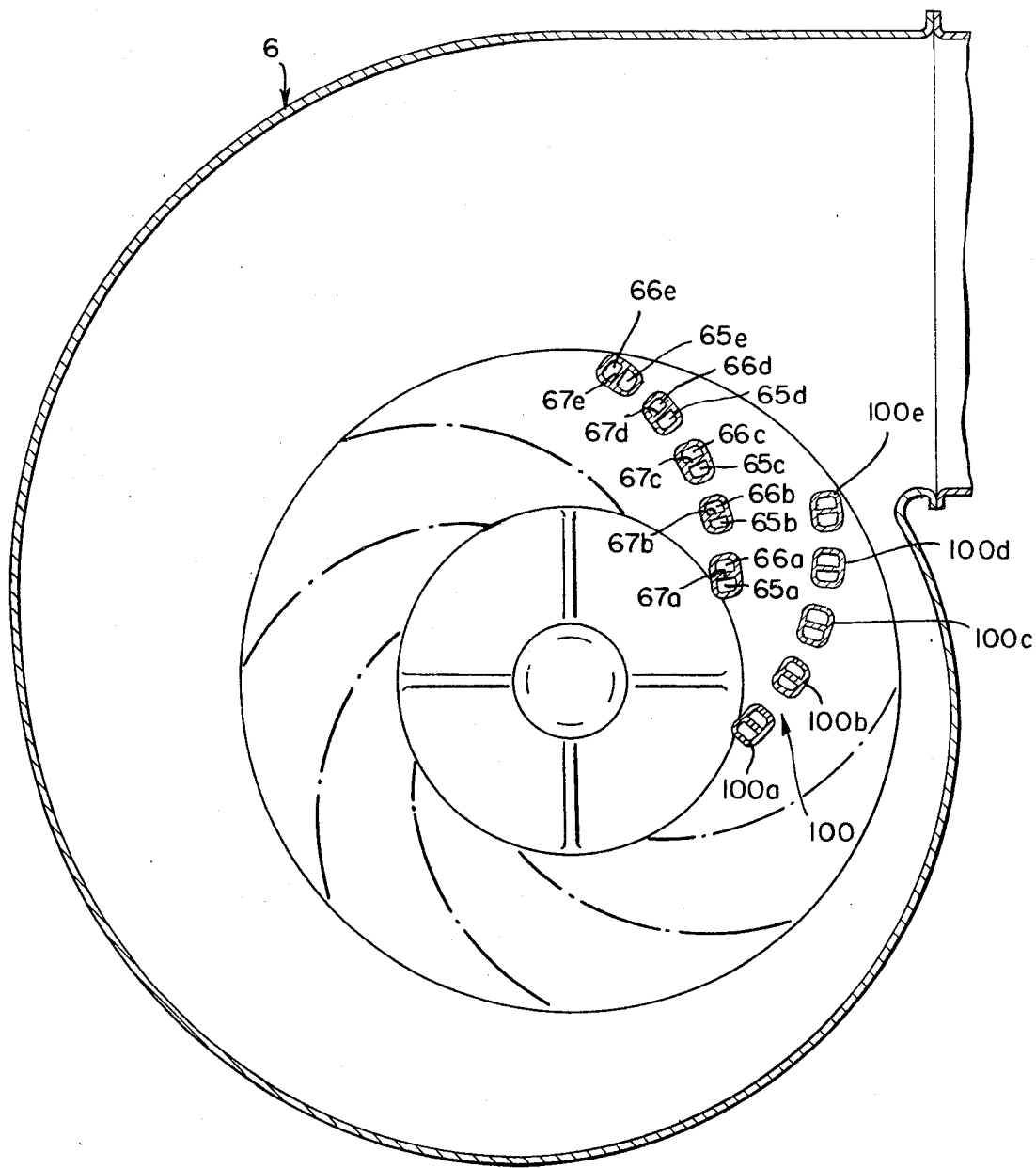
Figure 13:
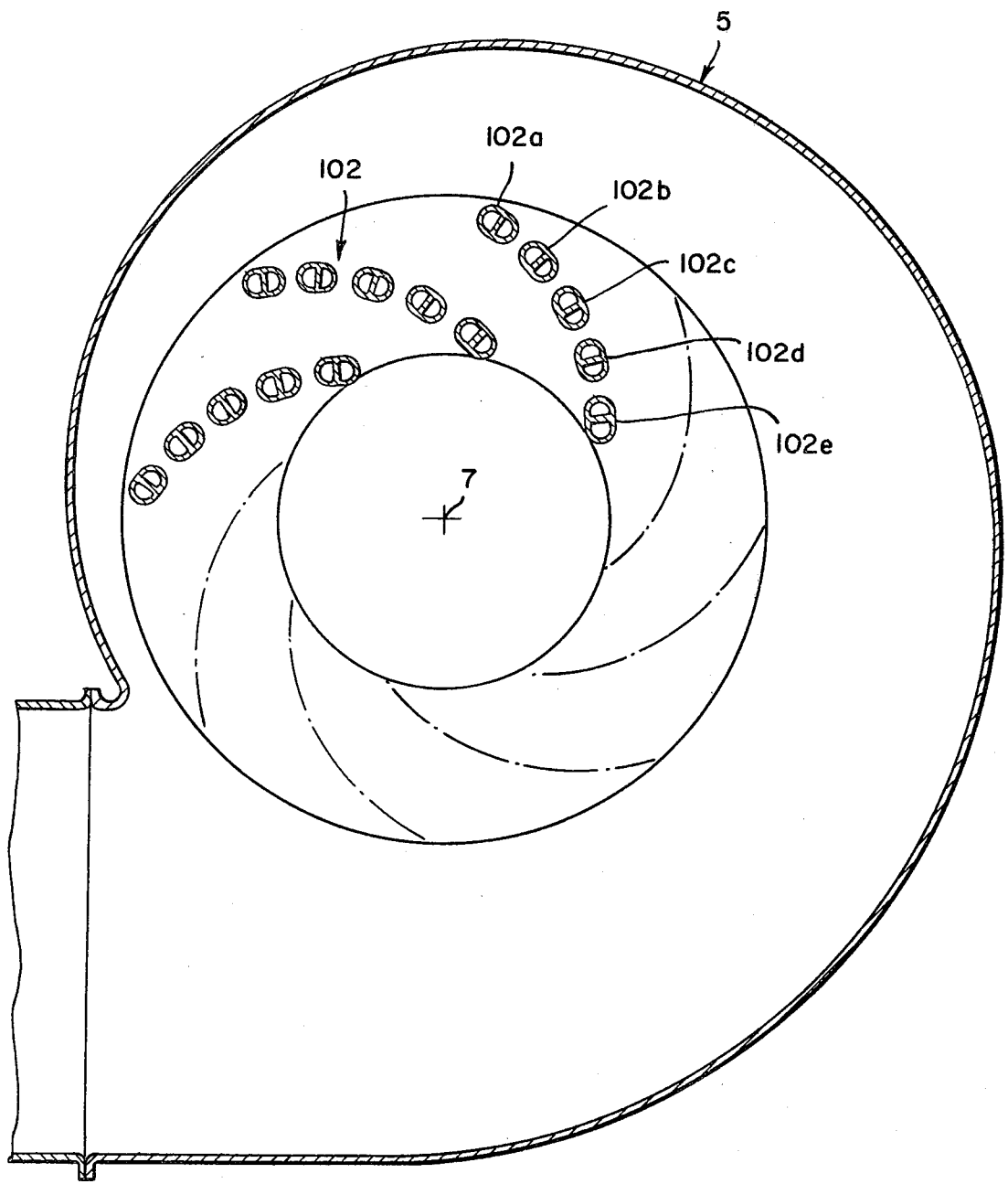

The two nested cylinders 56 and 57 of shaft 55 (FIG. 5) have been replaced, as illustrated in FIGS. 10 and 11, by a central shaft 106 and a sleeve 107 spacedly surrounding same. Shaft 106 is formed with ten sectoral channels 9a – 9e and 10a – 10e, communicating with respective manifolds of each rotor, conducting the heat carrier in opposite directions; the annular space between shaft 106 and sleeve 107 is axially subdivided for this purpose into transverse compartments 104a – 104e and 117a – 117e within rotor 6 and into similar compartments 105a, 105b etc. and 116a 116b etc. within rotor 5. These compartments, in turn, open into respective channels 9a – 9e, 10a – 10e as illustrated in FIGS. 10 and 11 for the channel 9b and compartments 117b, 105b. Shaft 106 traverses an end wall 110 of rotor 6 and terminates in an end cap 109.

Advantageously, as explained above, the pitch of the archimedean spirals defined by blades 100 and 102 is so correlated with the rotor speed that the blades exert substantially no reaction upon the surrounding air flow.

Figure 14:
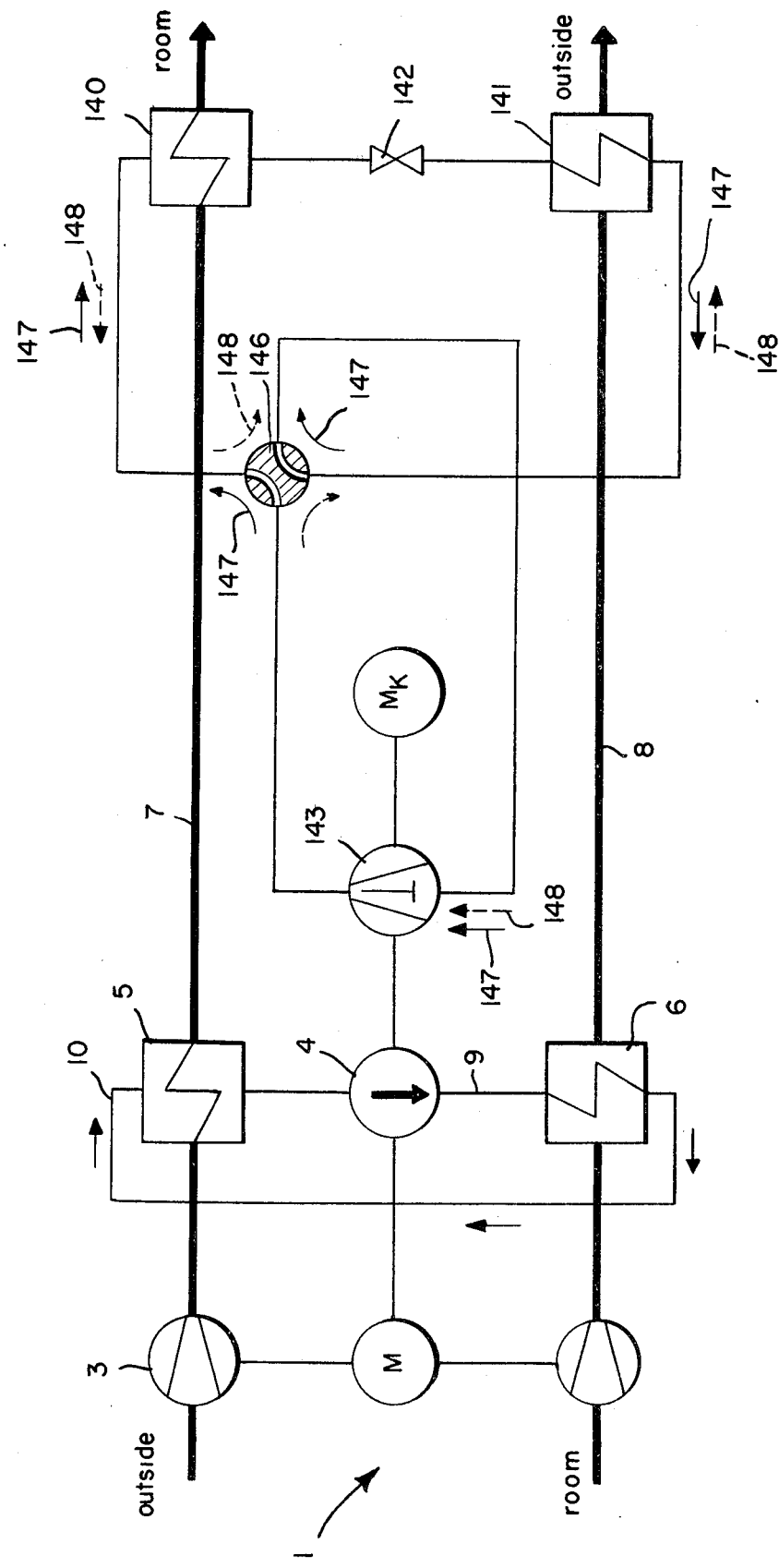
FIG. 14 is a block diagram similar to FIG. 1, representing a modified system.

FIG. 14 shows the flow diagram of FIG. 1 expanded to include an external source of thermal energy, specifically a heat pump, in direct heat-exchanging relationship with the air streams 7 and 8. This heat pump, which may be of the construction described in my prior U.S. Pat. No. 3,347,059, is reversible so as to provide either heating or cooling. The pump circuit includes a pair of additional heat exchangers 140 and 141 traversed by the incoming and outgoing air streams 7 and 8, respectively, these heat exchangers lying in circuit with a compressor 143 driven by a motor $M_K$ and an expansion valve 142. A four-way valve 146 allows the selective circulation of a heating/cooling fluid in either of two directions as indicated by arrows 147 (for heating of the room) and 148 (for cooling).

Heat-pump motor $M_K$ is advantageously mounted on a common shaft with the motor M of the temperature-control system 1.

Figure 16:
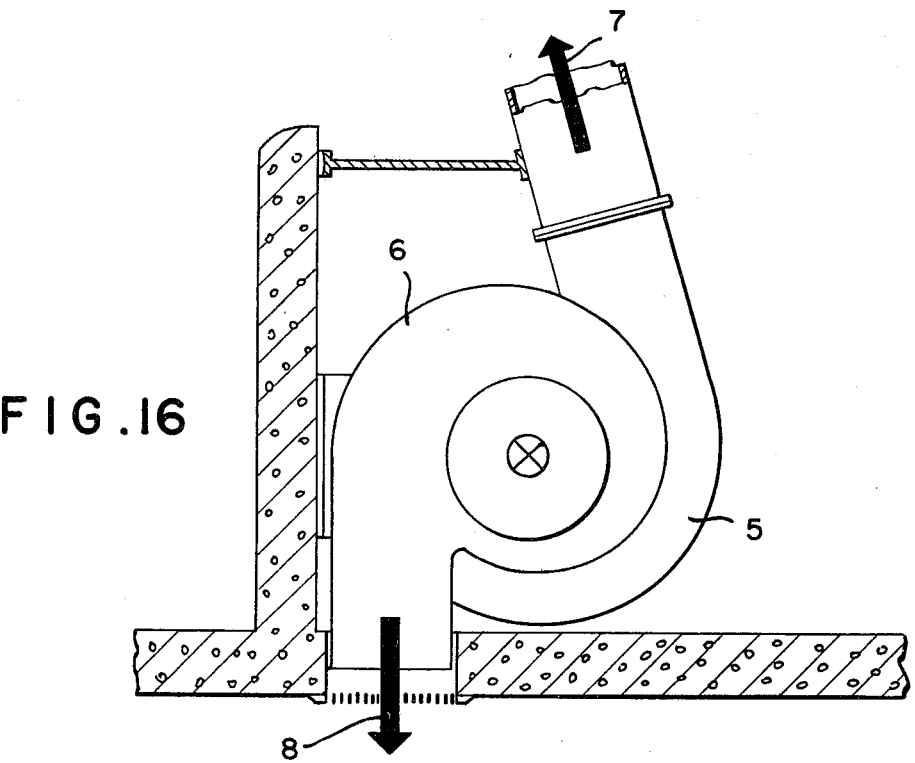
FIG. 16 is an end view of the apparatus shown in FIG. 15.
Figure 15:
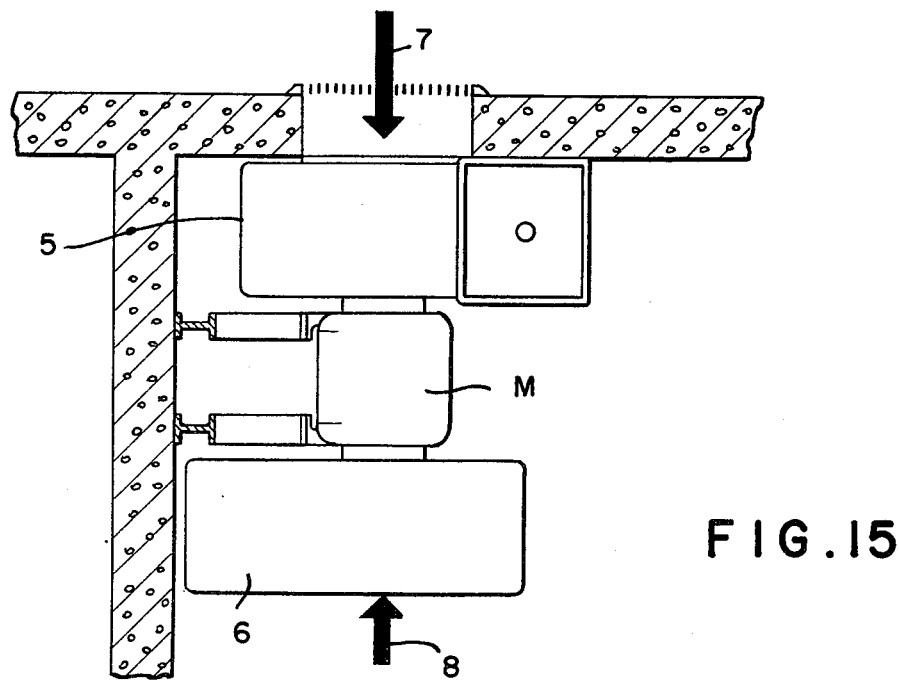
FIG. 15 is an overall plan view of an apparatus according to my invention, shown installed in the corner of a room.

In FIGS. 15 and 16 I have shown an apparatus according to my invention installed in an upper corner of a room to be cooled or heated. Incoming air (arrow 7) enters the heat exchanger 5 from above, either through a distributing manifold or directly through the roof, whereas outgoing air (arrow 8) is aspirated upwardly into heat exchanger 6 and then discharged laterally into the atmosphere.

Figure 17:
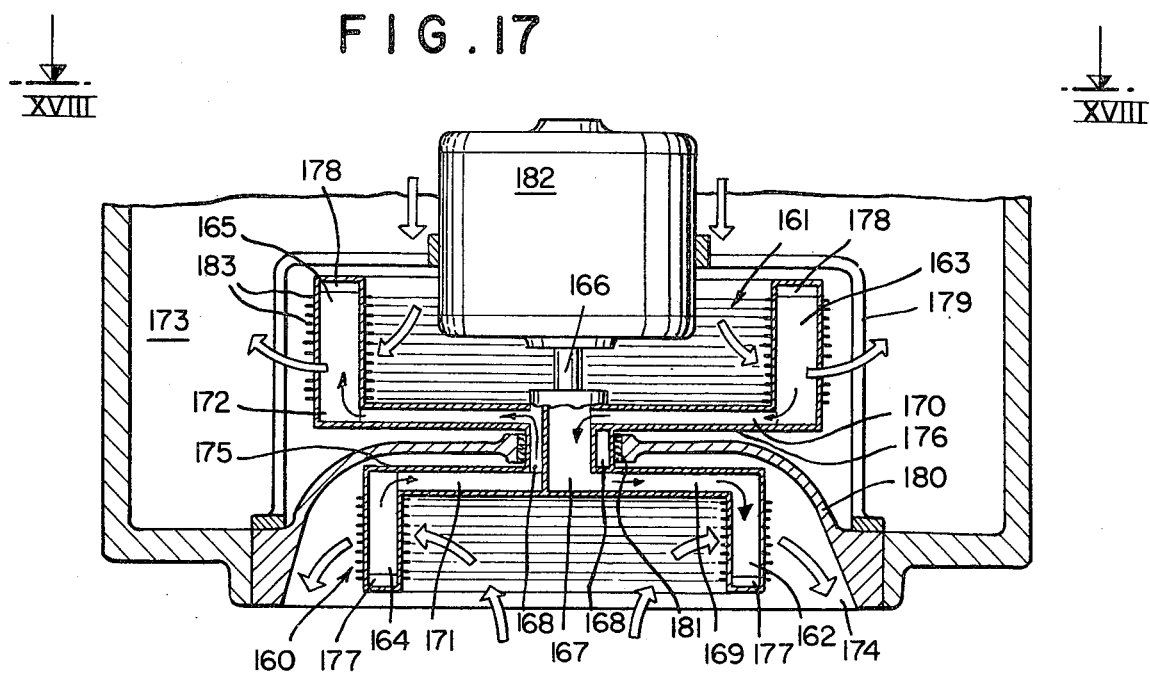
FIG. 17 is a sectional top view of yet a further embodiment.
Figure 18:
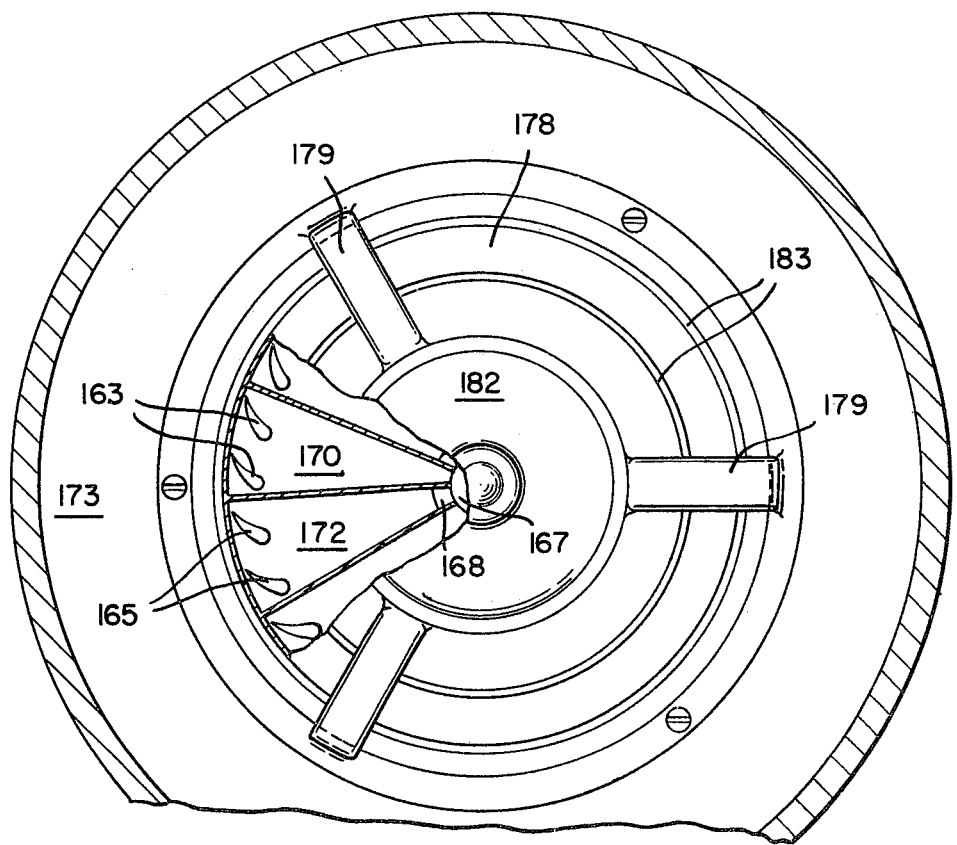
FIG. 18 is a cross-sectional view taken on the line XVIII—XVIII of FIG. 17.

FIGS. 17 and 18 illustrate a temperature-control apparatus according to my invention mounted in a housing 173 for electronic equipment (not shown) whose operation generates waste heat. The interior of housing 173 is sealed against the outside with the aid of an end cap 180 forming an outwardly open well 174 for an externally mounted rotary heat exchanger 160 of the centrifugal-blower type. A similar second heat exchanger 161 is linked with rotor 160 by a hollow shaft 166 journaled by a bearing 181 in cap 180. The rotors 160, 161 respectively comprise hollow blades 162, 164 and 163, 165 arranged in pairs as shown in FIG. 18.

The hollow shaft 166 provides two concentric channels 167, 168 which respectively communicate with separate compartments 169, 170 and 171, 172 in the facing end walls 175, 176 of the rotors 160, 161. The axial bores of two adjacent blades 162, 164 and 163, 165 of the rotors 160, 161 respectively communicate with the compartments 169, 171, 170, 172; thus, the blades 164 and 165 intercommunicate by way of the outer channel 168 of the shaft 166 while the blades 162 and 163 communicate with each other by way of the inner channel 167. The blades of each rotor are interconnected at the open ends of the rotors 160, 161 by short segments of annular ducts 177 and 178. Thus each blade has one end which communicates with one compartment in the hollow end walls of its rotor and another end connected to a blade communicating with an adjacent compartment. This establishes a closed circuit for the flow of a heat carrier through the rotors. The flow path begins at a blade 162 of the rotor 160 and extends via duct 177, blade 164, compartment 171, outer shaft channel 168, compartment 172 of rotor 161, blade 165, duct 178, blade 163 and back by way of the compartment 170, shaft channel 167 and compartment 169 to the blade 162. Arrows in FIG. 17 indicate the direction of flow of the warm air stream in the housing 173 and of the cool air stream in the well 174. The apparatus of FIGS. 17 and 18 preferably employs a heat-carrier fluid of low viscosity. The blades of the two rotors are provided with fins 183 to enhance the exchange of heat.

The rotor 161 in housing 173 absorbs heat, thereby cooling the air circulated by it. The rotor 160 in the well 174 is cooled by the external air it circulates. The colder carrier entering the compartment 172 is subjected to a radial force due to centrifugal action. As the diameter of the rotor 161 in housing 173 is larger than the diameter of the rotor 160 in well 174, the radial force urging the colder carrier outwardly in rotor 161 outweighs the countervailing forces acting upon the fluid in rotor 160 where the hot carrier has to displace the cooled carrier present in the blades 162, 164 near the rotor periphery.

This thermosiphon effect has been claimed in my copending application Ser. No. 234,433 filed March 13, 1972 as a division of application Ser. No. 847,771.

A drive motor 182 for rotors 160, 161 is supported in housing 173 by spider legs 179 integral with cap 180. Journal bearing 181 forms a fluidtight seal around the hollow shaft 166.

It will be noted that the inlet and outlet ports for the circulation of the colder airstream in well 174 communicate with the body of air surrounding the housing 175 whereas the inlet and outlet ports for the warmer air stream within housing 173 communicate with the body of fluid which is entrapped in the housing; this is in contrast to the construction shown, for example, in FIG. 4.

Figure 19:
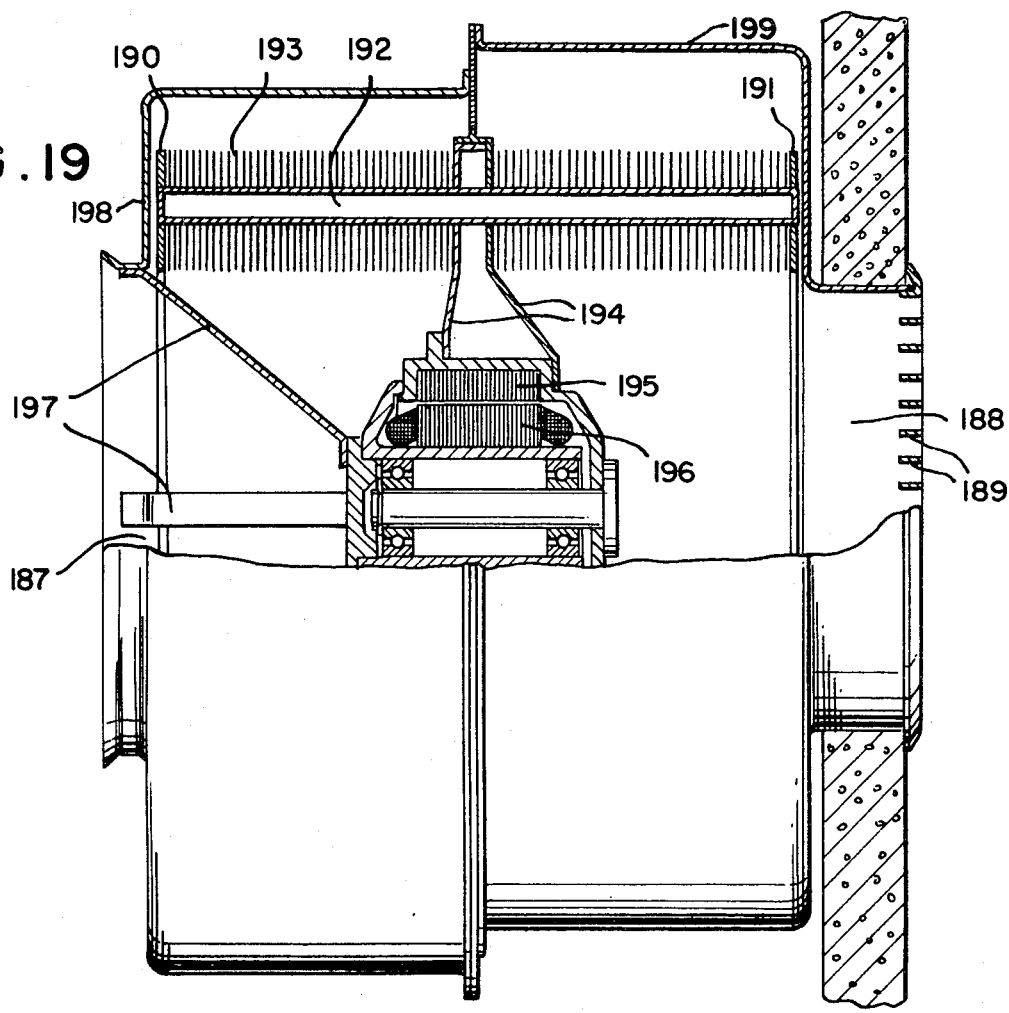
FIG. 19 is a partly elevational and partly sectional view of an apparatus representing still another embodiment.
Figure 20:
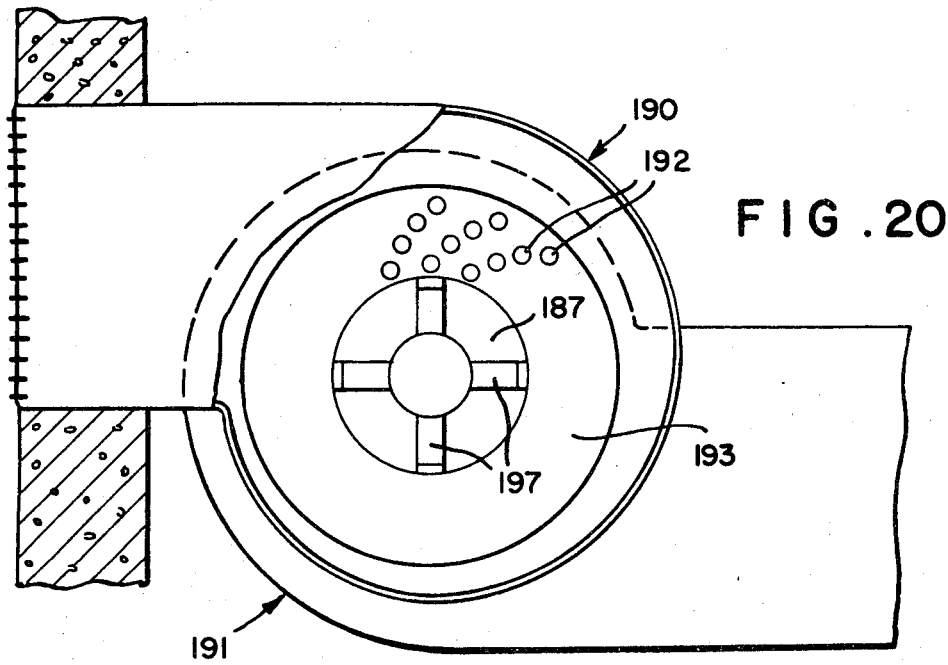
FIG. 20 is an end view (partly in section) of the apparatus shown in FIG. 19.
Figure 21:
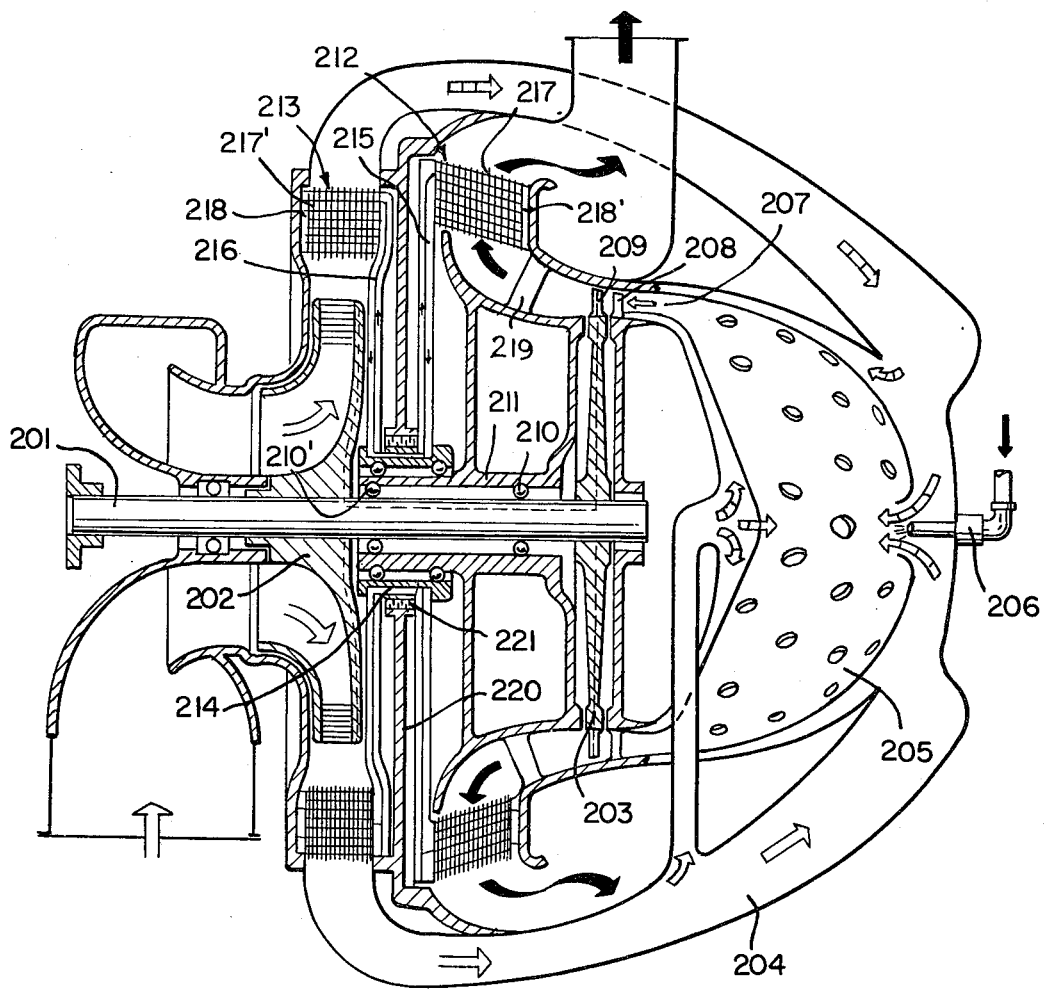
FIG. 21 is an axial sectional view of a gas turbine embodying a system according to my invention.

FIG. 19 is a partly elevational and partly sectional view of a further embodiment which comprises two rotary heat exchangers 190, 191 of the radial-flow type. The rotors 190, 191 circulate the air by shear force with the aid of axially extending tubes 192, traversed by the heat carrier, which are provided with annular fins 193 more clearly illustrated in FIG. 20. Tubes 192 may be round, as shown in FIG. 21, or may have an aerodynamically shaped profile as shown in FIG. 6, preferably so arranged as to form a set of reactionless blades. Rotors 190, 191 are mounted on a hollow disk 194 of a rotor 195 which forms part of an external-rotor motor 196. The motor 196 is supported on the housing 198 of rotor 190 by means of spider legs 197. The housings 198, 199 of rotors 190, 191 have a convoluted cross-section relatively offset in the peripheral direction to facilitate their connection to external air ducts. Air enters from the room by way of an inlet port 187 and from the outside by way of another inlet port 188 covered by a grill 189.

The two heat-exchange rotors 190, 191 are thermodynamically interlinked by the pipes 192 which are substantially equispaced along their circumference. The pipes 192 are filled with a fluid heat carrier which is maintained at a pressure insuring evaporation at the hot-air side and condensation at the cool-air side. The heat carrier advantageously consists of a combination of liquid and gaseous phases of the same fluid which therefore is present partly as a saturated vapor and partly as a condensate. Heat transfer within the pipes 192 is enhanced by centrifugal forces which reduce the thickness of the condensate layer at the cool-air side. The transport of condensate to the hot-air side, due to these differences in layer thicknesses, can be enhanced by a capillary tube lining as is well known per se.

In FIG. 21 I have shown a gas turbine embodying the principles of my invention. A shaft 201, connected to a load not shown, carries a radial-compressor wheel 202 and an axial-turbine wheel 203. A coaxial and approximately rotationally symmetrical combustion chamber 205 is supplied with compressed air via conduits 204 and with fuel via a nozzle 206. The hot combustion gases, expanded in an annular channel 207, flow through a guide-blade ring 208 and then traverse a set of hollow axial blades 209 of the turbine wheel 203. The shaft 201 is journaled in anti-friction bearings 210 and 210' in a housing portion 211; a heat-exchanger unit, consisting of a first heat exchanger 212 constituting the heat sink and a second heat exchanger 213 through which the compressor air flows, is also carried by the same stationary housing portion 211 by means of a hub 214 having channels 215 and 216 radiating therefrom. The heat exchangers 212 and 213 comprise tubes 217 and 217' with substantially parallel axes, the tubes communicating with one another at their outlying ends by rotary annular chambers 218 and 218' and with the channels 215 and 216 at their opposite ends. The entire channel system is filled with a thermally stable liquid, preferably a eutectic of sodium and potassium. A guide-blade ring 219 gives the stream of exhaust gas emerging from the axial blading 208, 209 a whirl whose thrust serves the purpose of driving the unit 212, 213 by its passage through the heat exchanger 212. As a result of the rotation of the heat exchangers and the heating up of the wall of the channels facing the turbine, the enclosed liquid heat carrier is set in circulation (arrows) by the aforedescribed thermosiphon principle since in the larger-diameter heat exchanger 212 the inwardly flowing liquid stream is of lower density than the portion of liquid flowing outwardly from the interior. In this way the heat which is withdrawn from the exhaust gas in the heat exchanger 212 is transferred to the compressor air via the heat exchanger 213. The two heat exchangers are separated by a partition 220 which is split into two halves and carries a shaft seal 221.

I claim:

1. A temperature-control system for a space provided with means for maintaining a first external fluid therein at a temperature differing substantially from that of a second external fluid in an adjoining environment, comprising:

a stationary support;

a structure rotatably mounted on said support, said structure including a first heat exchanger exposed to said first external fluid in said space and a second heat exchanger exposed to said second external fluid in said adjoining environment;

hermetically sealed conduit means in said structure interlinking said heat exchangers and forming a closed path for a heat-carrier medium abstracting heat from the warmer one of said external fluids and giving off heat to the colder one of said external fluids;

drive means coupled with said structure for rotating same about an axis; and circulation means in said conduit means for propelling said medium therethrough, said circulation means including first blade means internally fixed to said structure, second blade means in tandem with said first blade means rotatably mounted in said structure, and coacting magnetic means on said support in operative relationship with said second blade means for restraining said second blade means against rotary entrainment by said structure, relative to said support thereby subjecting said medium in said path to relative rotary motion between said first and second blade means.

2. A system as defined in claim 1 wherein said first and second blade means form annular arrays centered on said axis.

3. A system as defined in claim 2 wherein said structure is generally cylindrical, said conduit means including a plurality of axially extending channels and a chamber communicating with said channels at an end of said structure, said chamber being disposed at said end.

4. A system as defined in claim 3 wherein said support forms a housing around at least one of said heat exchangers provided with guide means for an external fluid thermally interacting with said medium in the vicinity of said end.

* * * * *